United States Patent [19]
Forrey

[11] Patent Number: 5,969,430
[45] Date of Patent: Oct. 19, 1999

[54] DUAL TURBINE WIND/ELECTRICITY CONVERTER

[76] Inventor: Donald C. Forrey, 11308 Dunbrook Rd., #203, Richmond, Va. 23235

[21] Appl. No.: 09/035,083

[22] Filed: Mar. 5, 1998

[51] Int. Cl.$^6$ ........................................................ F03D 9/00
[52] U.S. Cl. ................................................ 290/54; 290/44
[58] Field of Search .................................. 290/43, 44, 54, 290/55

[56] References Cited

U.S. PATENT DOCUMENTS

| | | |
|---|---|---|
| 436,595 | 9/1890 | Collins . |
| 906,754 | 12/1908 | Tschirgi . |
| 1,321,415 | 11/1919 | Brown . |
| 3,944,840 | 3/1976 | Troll .......................................... 290/55 |
| 3,986,786 | 10/1976 | Sellman ....................................... 415/2 |
| 4,315,713 | 2/1982 | Verplanke ................................ 415/2 R |
| 5,182,458 | 1/1993 | McConachy ................................ 290/55 |
| 5,206,537 | 4/1993 | Alejandro et al. ....................... 290/1 R |
| 5,850,108 | 12/1998 | Bernard ..................................... 290/54 |

Primary Examiner—Nicholas Ponomarenko

[57] ABSTRACT

A technology for maximizing wind to electricity conversion through more fully utilizing bypass air, exterior wind, and static head with the primary objective of generating commercial quantities of electricity. In this application the installation consists of horizontal dual turbine cells connected in tandem to drive a generator. Rows of such cells and generators are designated batteries. Batteries are stacked vertically to form banks. Banks installed end-to-end form arrays that can be extended to any length desired. The arrays present a large frontal area to the wind and acts as a dam to impound the air and create a high pressure on the windward side. The differential pressure adds to the energy of the air flowing through the cells. A cell is comprised of a pair of turbines synchronized to maintain the relative positions of the vanes. The housing is aerodynamically designed for optimal airflow through and around the cell. The airflow around the cell is utilized to exhaust the spent air from the cells to increase efficiency. The vane arrangement more fully extracts the energy from the air flowing through the cell.

A secondary application provides for vertically mounting one or more cells that rotate with the direction of the wind.

3 Claims, 2 Drawing Sheets

DUAL TURBINE WIND/ELECTRICITY CONVERTER

CROSS-REFERENCE TO RELATED APPLICATIONS

U.S. Pat. Nos. reviewed: 43,663; 222,256; 381,679; 1,503,016; 1,592,417; 1,595,578; 1,652,022; 3,883,750; 3,944,840; 3,986,786; 4,018,051; 4,047,834; 4,079,264; 4,142,822; 4,164,382; 4,269,563; 4,320,304; 4,321,005; 4,324,985; 4,350,900; 4,365,929; 4,379,236.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

A review of patents and literature on proposals and practices on converting wind energy into electrical energy are flawed for one or more of the following reasons:

1. Overestimating the energy of wind. The low density and viscosity of air develops only a small force per square inch. A large working area is required to develop an appreciable amount of force.

2. The low density and low viscosity makes airflow fragile and unstable. Extraneous structure and bends dissipate the wind energy.

3. The energy entering a converting device or apparatus can not be increased. The potential energy in an air stream is derived from the velocity head and the static head. Increasing the velocity of the air in venturi-type arrangements lowers the static head proportionately.

4. The air that has done its work must be removed. Structures that create turbulence downstream will block the removal.

5. Weather and climate must be a consideration to have wide application.

6. Failure to employ torque enhancing features.

7. Over-emphasizing omnidirectional capability.

8. Economics. Extravagant structure and intricate details add cost to fabrication and construction as well as to the maintenance costs.

The freestanding large diameter propeller-driven generator is the only type that has found application. The efficiency has been much exaggerated. The efficiency should reflect the percentage of the total wind available. This type of generator creates turbulence both laterally and downwind extending far beyond the working area of the propeller, which limits the closeness of the spacing between generators. Most of the wind available is wasted. The wide dispersal requires a large area of land. Another factor that lowers its efficiency is that the disk swept by the propeller is not uniformly loaded. A velocity profile diagram shows that the velocity is greater in the upper position than in the lower position. Thus the lower position is a drag on the upper. If the propeller is not oriented into the direction of the wind, the efficiency will decrease rapidly with shifts in the wind direction. Weather and climate limits the extent of its application because of the exposed design.

BRIEF SUMMARY OF THE INVENTION

The proposed invention attempts to avoid the flaws enumerated for housed units as well as the shortcomings of the large diameter propeller driven generators. The objectives are to increase the efficiency of wind conversion and to provide an installation for more effective generation of commercial quantities of electricity.

Authorities state that about 41 percent of the wind is wasted in a wind conversion device. Any appreciable increase in efficiency must come from this wasted wind. Efforts then should be directed to more effective use of the working air; more efficient use of the bypass air; a secondary means to remove the spent air; and decreasing the turbulence downwind. For commercial generation the objectives are to more fully use the total wind flow; limit land requirements; provide wider climate range; and an installation that can be located closer to the points of usage. Economy should be a major consideration because the capital cost to watt ratio of wind derived electricity is costly compared to other sources. Nuclear power would be the method of choice in a rational society, but government policy has limited the development to a very primitive state of the art.

This invention employs a modular concept utilizing identical parts for economy. The basic unit is a cell. A cell is comprised of a pair of turbines mounted in a housing. Each turbine consists of an axle mounted between end walls. Bearings are located in the end walls to support the axles and transfer the rotation to connecting cells and to generators. The distance between the end walls will primarily be determined by the turbine vane requirements. The axle will have two or more arms to which one or more vanes are attached to provide the working area. The vanes are located on the outer ends of the arms to maximize torque. The lower torque area nearest the axle provides passage for spent air.

The housing is designed for optimal airflow around and through the cell. The outside of the shell is aerodynamically designed to create a streamlined flow in the exterior wind that aids in educting the spent air from the interior. The vanes of the turbines over lap so that a cascade is formed to more fully utilize the energy of the air flowing through the cell. The higher pressure at the inlet and the lower pressure at the outlet created by the streamline of the exterior air and the dam effect of an array along with more complete usage of bypass air will increase the efficiency. Provision is also made to extract the air from the interior to lower the resistance encountered by the vanes on the return path. The cells may be located in a vertical position or a horizontal position. In the vertical position provision can be provided for the assembly to rotate with the wind direction.

For a commercial installation several cells are connected in tandem to drive one or more generators. The cells and generators will be referred to as batteries. The batteries are stacked to form banks. Banks installed end-to-end form an array. This large frontal area captures the total wind flow. In effect it acts as a dam. The wind creates a higher pressure on the windward side and a lower pressure on the downwind side, which enhances the operation of the turbines.

The output from wind-driven generation of commercial quantities of electricity can only be regarded as a supplementary supply. The vagaries of the wind make it a very unreliable source for electricity. The advantage of wind derived electricity is the conservation of fuel and avoiding the problems of disposing of waste products. Intermittent operation can be an acceptable condition for a commercial operation. The objective is to maximize output over a period of time. For most localities the wind predominantly flows from one direction, or reverses direction in daily or seasonal cycles. In a location with a strong day-wind a unidirectional installation produces more power and a peak demand. The cells can be configured for less efficient bidirectional operation for more operating hours through a cycle.

The horizontal arrangement does provide that even with relatively large shifts in wind direction usable thrust will be delivered to the vanes. The horizontal arrangement of the batteries provides that each row will be uniformly loaded and the vanes will not be affected by angular displacement of thrust.

The housed turbines are less effected by weather conditions and thus can be installed over a much wider range of climates and conditions. The heat generated by friction within the housing and the capability of adding auxiliary heat alleviates icing effects. The design is such that laminar flow of the wind is preserved. Thus other arrays can be placed downwind in close proximity. The housing of the turbines will decrease noise generation. The land area requirements, the abated noise, the elimination of extraneous turbulence, and esthetic considerations enable an installation to be located near points of usage.

BRIEF DESCRIPTION OF THE SEVERAL VIEWS OF THE DRAWING

The drawings are schematic in nature. Primarily they are to show the design elements and pertinent features to be considered in fabrication and construction. The hatching does not denote material, but is used to delineate components. Because the crux of the invention deals with fluid mechanics the housing is shown solidly hatched to more clearly visualize the airflow. The details of the internal structure are incidental. The specific details of fabrication and construction are those common in engineering and design general practices and will be dependent on variations and options in size, installation, and materials.

DETAILED DESCRIPTION OF THE INVENTION

Figure 1:
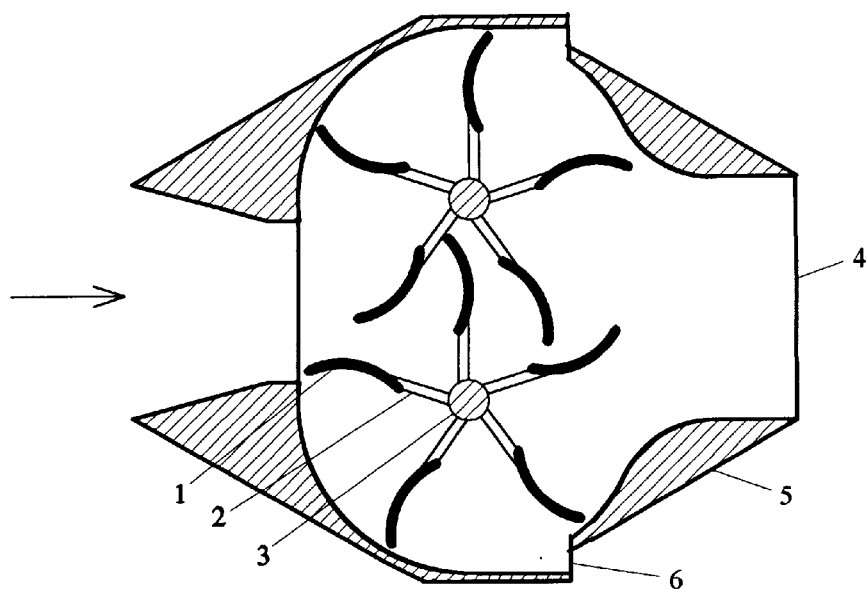
FIG. 1 is a section through a turbine cell showing the basic elements and serves to describe the features and operation.

FIG. 1 embodies the details of a dual turbine cell assembly. The preferred arrangement consists of two identical turbine assemblies. One of which is inverted to obtain the proper orientation of the vanes 1. Each turbine consists of several sets of vanes 1 attached to arms 2 that are symmetrically mounted on axle 3.

The vanes 1 are located at the ends of arms 2 to develop maximum torque. The spent air passage is at the lower torque area nearest the axle 3. The vanes 1 may be curved, flat, or of a more sophisticated aerodynamic design. In the preferred arrangement the arms 2 are not located on the centerline between the turbines but on a chordal extension parallel to the centerline. This offset of the vanes 1 provides greater coverage of the flow area and distributes the airflow. In this multivane overlapping arrangement the air encounters several vanes 1 which more fully extracts the energy from the working air and the bypass air. The preferred method of synchronizing the rotation of the turbines to maintain the relative positions of the vanes 1 is through electronic control of the generators. The synchronization could be done with a gearing assembly or with timing belts or chains and idlers, which could also be used to eliminate one of the generators.

In this configuration the turbine assemblies are housed between identical bulkheads 4.

In the preferred arrangement the turbine assemblies are housed between identical sidewalls 5 with one inverted to obtain the configuration shown. They are contoured to develop optimum efficiencies in the airflow pattern.

The exterior surface is streamlined to maintain the velocity and laminar flow of the wind. The exhaust air at the outlet will have lost its velocity and developed turbulence. The effect of the streamline flow of the exterior air will be to induce the flow of air from the interior of the cell and suppress turbulence downwind of the installation.

The interior of the sidewalls 5 is configured so that the wind entering the inlet only works on the central vanes 1. The return path of vanes 1 is shielded from the wind to prevent energy losses from the wind working on them. The interior surfaces of the walls are fitted to the circumference swept by the turbines to reduce turbulence within the housing. The interior corners at the outlet are radiused to provide a smoother exit of air.

Axial slots 6 are provided in the sidewalls 5 to provide an exit for non-working air within the cell that the vanes 1 encounter on their return path.

Figure 2:
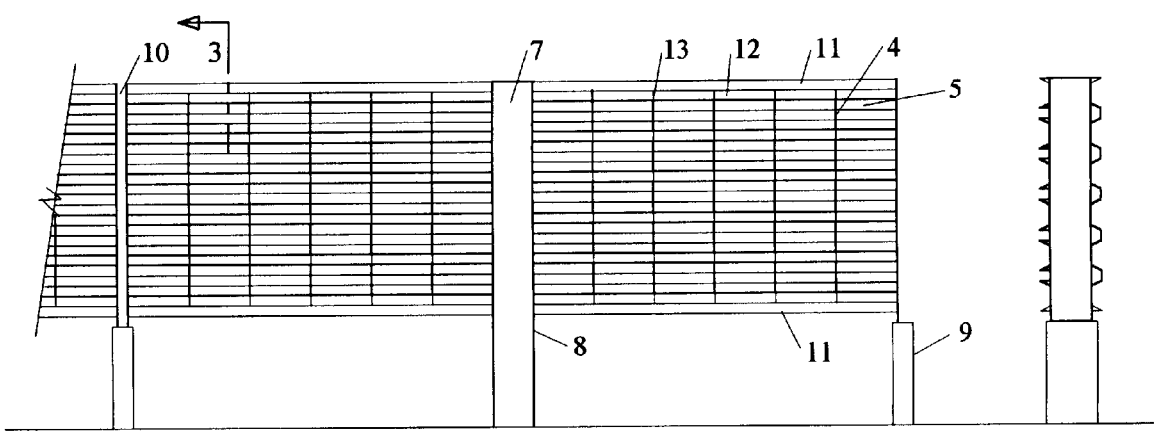
FIG. 2 is the elevation and end view showing the general arrangement of cells in an installation for generating commercial quantities of electricity.

FIG. 2 depicts an installation utilizing the cell arrangement as shown in FIG. 1. It shows the general arrangement of banks of batteries comprised of turbine cells. A battery consists of tandemly connected cells and one or more generators 7 that are housed in structure 8. Structure 8 also serves as an anchor for the bank. Structure 9 provides support for the free end of the bank. A space 10 is provided between banks for thermal expansion in an array of banks installed end-to-end.

The length of an array is not inherently limited. The number of batteries stacked to make a bank will depend on the dimensions of the cells and structural analysis. It can be seen that the large frontal area acts as a dam. The wind develops a high pressure on the windward side and a low pressure on the downwind side. The projections of the cells' inlets obstruct the flow of wind in the upward and downward directions.

Figure 3:
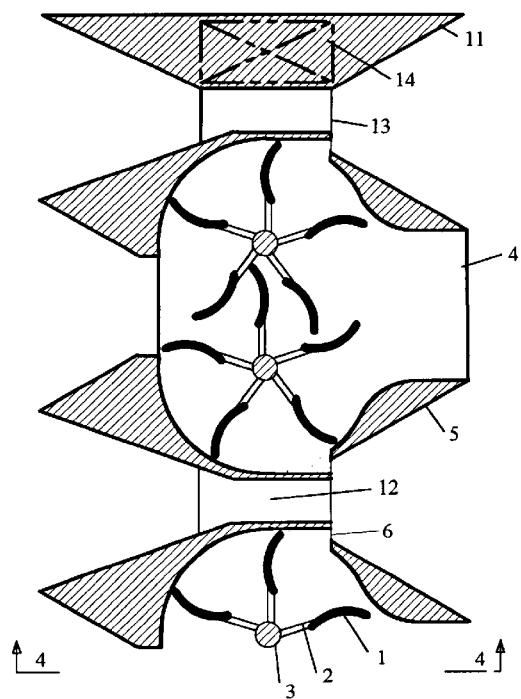
FIG. 3 is a partial section through FIG. 2 showing the basic arrangement of cells in a commercial installation and indicates the design concepts of operation.

FIG. 3 is a partial cross-section through a bank showing more particular details of assembly and operation. A shroud structure 11 is added to the top and bottom of the banks to develop the venturi 12 for the outermost banks. Structural members 13 support the cells between the trusses 14, which are designed to resist the forces imposed on the banks and are enclosed in the shroud structure 11.

As can be seen the venturi 12 acts to exhaust the air from the interior of the cells through slot 6 and thus lowers the resistance encountered by the vanes 1 on the return path. The venturi 12 is sized and configured so that the inlet pressure approximates the inlet pressure at the cells.

Figure 4:
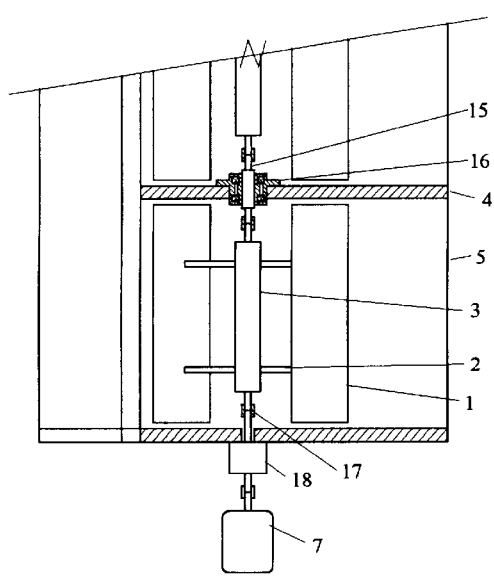
FIG. 4 is a plan section of FIG. 3 showing the basic components.

In FIG. 4 the axle is connected to a stub shaft 15, which is integral with a bearing assembly 16 mounted in bulkhead 4. The stub shaft 15 and the inner race of bearing assembly 16 are splined or keyed to provide for differential expansion between axles 3 and housing 5. Connections between components are made with couplings 17. In the preferred arrangement a generator 7 is connected to a clutch and/or brake assembly 18 to expedite maintenance and is mounted on a bulkhead 4. The optimum design length of vanes 1 determines the spacing between bulkheads 4. Generator 7 may be a double-end shaft generator with cells connected at both ends.

Figure 5:
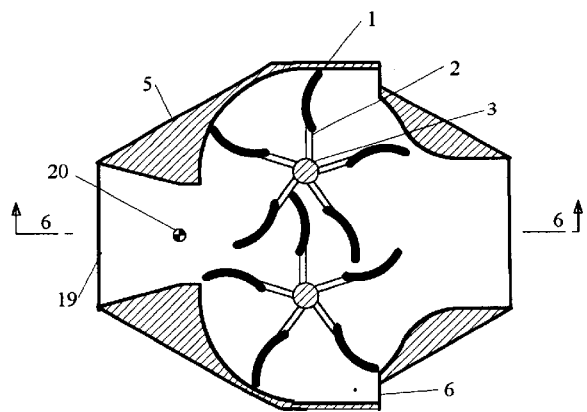
FIG. 5 is a plan view of an individual cell mounted in a vertical position.

FIG. 5 depicts an option of a cell mounted with the axles 3 in the vertical position. The turbine assemblies and sidewalls are mounted between endplates 19. Point 20 denotes the center of rotation for an installation that rotates with the wind direction.

Figure 6:
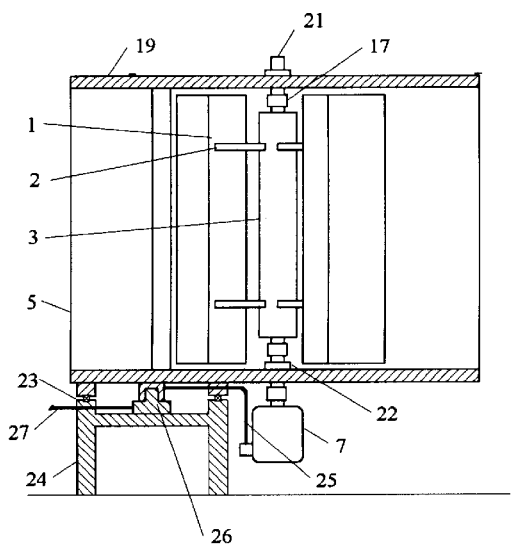
FIG. 6 is a longitudinal section through FIG. 5 showing the rotation details.

In FIG. 6 the turbines are supported in bearing assemblies 21 and 22 in the endwalls 19. The cell is mounted through a bearing assembly 23 to a structure 24. A cable 25 connects the generator 7 output to brush assembly 26. From the fixed end of the brush assembly 26 cable 27 connects the output to the electricity supply system.

What I claim as my invention is:

1. A wind turbine power generating system comprising:
   a dual turbine assembly cell, where each turbine comprising:
   a turbine axle,
   a plurality of generally rectangular shape arms attached to said axle,
   a plurality of generally rectangular shape vanes attached to said arms,
   wherein said dual turbine axles positioned in parallel one above the other and spaced their vanes overlap during rotation and provide a frontal resistance to the incoming wind;
   a housing for said dual turbines comprising:
   an inlet,
   an outlet,
   an inner chamber with inner walls generally fitted to the circumference swept by the vanes;
   an exterior walls that extend from the apex at the inlet and outlet angling to a segment of the exterior wall parallel to the centerline of the inlet with slots at the said segment of the exterior wall;
   end walls and intermediate walls as required to support said dual turbine axles;
   an electrical generator connected to one of said dual turbine axle to receive torque from the turbines during their rotation by the wind.

2. A wind power generating system of claim 1 where said dual turbine assembly cells are connected in rows and columns to act as a dam for the wind.

3. A wind turbine power generating system of claim 1 where said turbine axles mechanically interconnected between themselves and connected to one or more generators to generate electricity.

* * * * *